Patented May 7, 1935

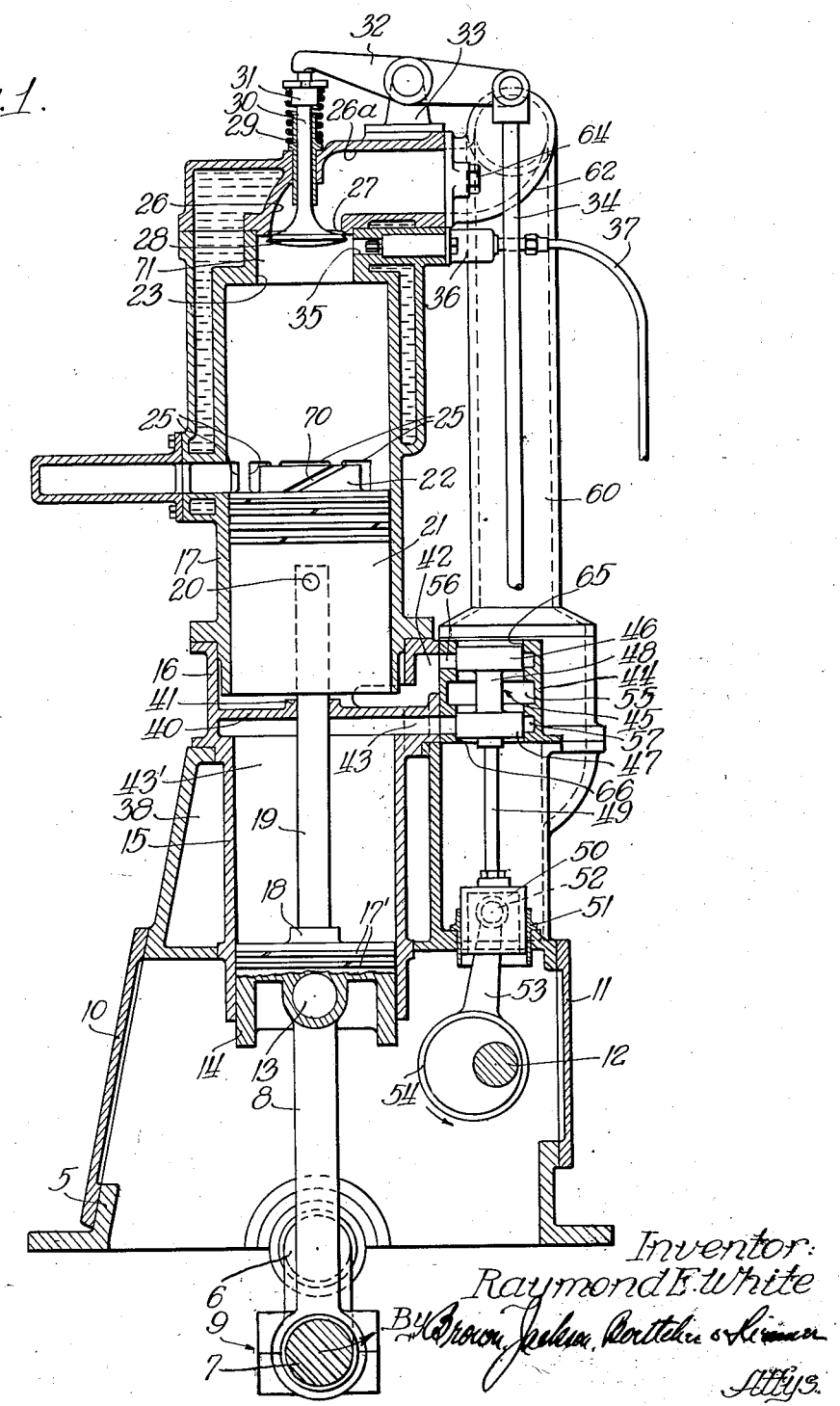

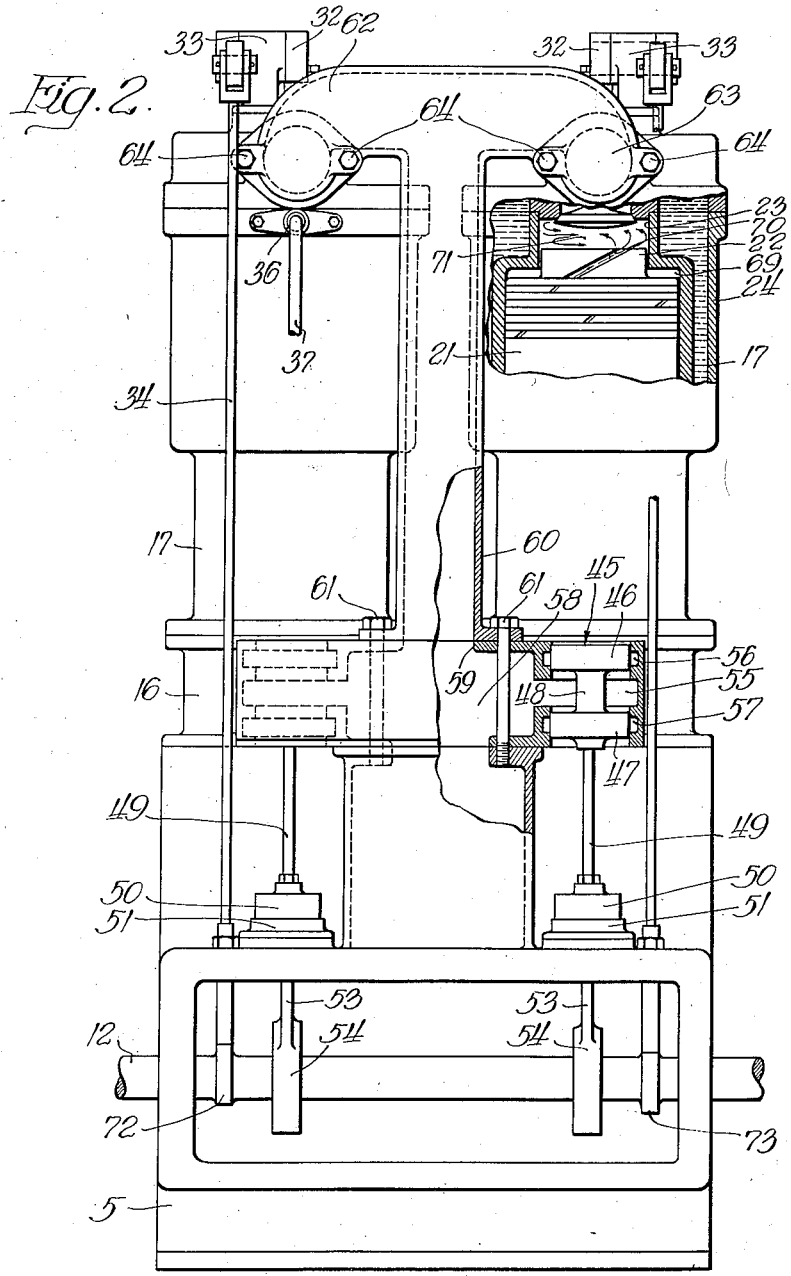

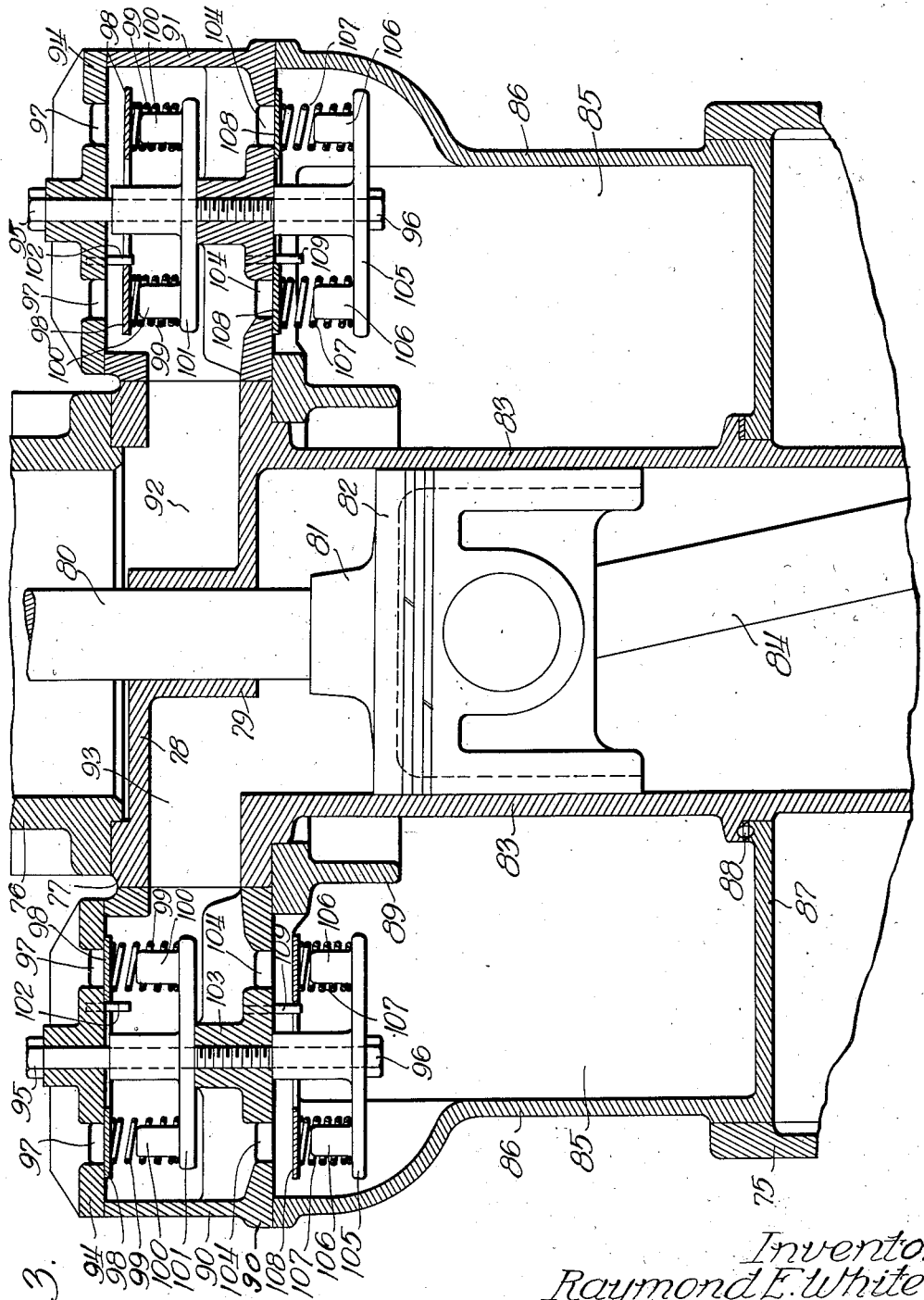

2,000,267

UNITED STATES PATENT OFFICE 2,000,267

DIESEL ENGINE

Raymond E. White, Seattle, Wash.

Application March 7, 1932, Serial No. 597,110

1 Claim. (Cl. 123—71)

This invention relates to engines, and more particularly to the type of engine known as a Diesel engine, wherein the fuel is forcibly injected into the cylinder and is exploded by the high temperature resulting from the compression of the air in the cylinder head when the piston is at the uppermost portion of its compression stroke.

In the preferred embodiment of the present invention, I have disclosed a Diesel engine of the two-cycle type, but it is to be understood that my invention is equally applicable to other than the two-cycle type of engine. I provide this engine with a cross-head similar to that used in steam engines, in order to produce an effective scavenging and supercharging action. The cross-head functions as an air pump to supplement the pumping effect of the under side of the power piston. Upon reciprocatory movement of the piston, the cross-head and under side of the power piston alternate in pumping fresh air to a receiving chamber located adjacent the crank case. This receiver chamber is adapted to supply the pumped air under pressure through a suitable inlet valve at or adjacent the top of the cylinder to effect a thorough scavenging of the cylinder after explosion and to supply a charge of fresh air to the cylinder under pressure for the compression stroke.

The scavenging and supercharging effects are thus produced without resorting to the use of external auxiliaries, and at the same time the use of exhaust valves is eliminated, since the exhaust ports can be permanently opened to atmosphere. Also, precipitated fuel from the cylinder cannot enter the crank case, due to the interposition of the cross-head, and therefore cannot dilute the lubricant contained in the crank case. Further, the charge of incoming fresh air cannot pass the cross-head to flush out the lubricant contained in the crank case.

The cross-head guide may be applied to the engine in the form of a removable liner, with removable breather valve cages associated therewith, these valve cages having suitable valves disposed therein and operated by the suction produced by the power piston and cross-head to draw outside air into the liner. This air is then forced into the receiver chamber and from this chamber is conducted through a suitable manifold to the inlet valve or valves of the cylinder. It thence passes into the cylinder during the latter part of the explosion stroke, and forces the products of combustion present in the cylinder out through the open exhaust ports. As the power piston begins its compression stroke, the inlet valve is closed, trapping the fresh air, which is under a pressure substantially greater than atmospheric pressure, in the cylinder for compression by the piston during the compression stroke.

In place of the breather valves, the engine may be provided with mechanically driven valve means driven from an eccentric disposed on the cam shaft of the engine, this valve being capable of positively controlling the air flow to the receiving chamber and thence to the manifold. The mechanically driven valve means may be disposed adjacent the cross-head, and is so operated as to receive alternately air under pressure from the under side of the power piston and from the cross-head to pass the air into the receiver chamber. This valve means is capable of operation at any speed of the engine, and requires no external accessory apparatus.

A further feature of the present invention resides in a novel type of piston head whereby increased atomizing and mixing effects are produced in the cylinder adjacent the fuel injection port. This is accomplished by providing a piston having an extending head portion provided with angularly disposed grooves or passages, so that the air trapped in the cylinder as the piston nears the end of its compression stroke is given a turbulent motion, assuring thorough mixing of the fuel with the compressed air prior to the explosion of the mixture.

Other objects and advantages of my novel invention will appear more fully from the following detailed description, which, taken in connection with the accompanying drawings, will disclose to those skilled in the art the particular construction and operation of a preferred form of the invention.

In the drawings:

Figure 1 is a section elevational view of a Diesel engine embodying my invention;

Figure 2 is a fragmentary side elevational view partially in section, of the engine shown in Figure 1; and Figure 3 is a sectional elevational view showing a modified form of the invention.

Referring now in more detail to the drawings, I have disclosed in Figures 1 and 2 a two-cylinder, two-cycle type of engine. This engine is provided with the usual crank case, indicated by the numeral 5, which contains the crank shaft 6 mounted for rotation therein. The crank shaft 6 is provided with the crank throw 7, about which is secured the piston rod 8, as by means of the bearing indicated generally by the numeral 9.

The crank case 5 is provided with the cover plate 10, which may be secured thereto by means of suitable bolts or the like, and is also provided, upon its opposite face, with a second cover plate 11, which is provided for the purpose of permitting access to the cam shaft 12 disposed in the crank case. The connecting rod 8 is connected at its upper end to the wrist pin 13 carried by the cross-head 14. The cross-head 14 has reciprocatory movement in the cross-head guide indicated at 15, this guide being carried by a suitable liner 16 interposed between the cylinder 17 and the crank case. The cross-head 14 has suitable rings indicated at 17', and is provided with the extending boss portion 18 adapted to receive the lower end of the cross-head rod 19.

The upper end of the rod 19 is journaled upon a piston pin 20 carried by the piston 21, this piston being mounted for reciprocatory movement within the cylinder 17. The piston 21 is provided with the usual piston rings, and at its upper surface is provided with the projecting portion 22 which is adapted to move into and out of the reduced upper end 23 of the cylinder 17 in relatively tight sliding engagement with the surrounding wall thereof. The upper portion of the cylinder 17 is provided with the surrounding water jacket 24 for cooling purposes, as is well known in the art. The cylinder 17 has exhaust ports 25 which are open to atmosphere when the piston is at or near its lower limit of travel. These ports have no valves or the like.

Disposed at the top of the cylinder 17 is the inlet port indicated at 26, a suitable valve seat is indicated at 27, and an overhead valve 28 is positioned for engagement with the valve seat 27. The valve 28 is mounted in the sleeve or bushing 29 for sliding movement therein. The valve stem 30 projects outwardly from the sleeve 29 and is provided with the enlarged head 31, which is adapted to be engaged by the usual type of valve rocker arm 32 pivoted at 33. The other end of the rocker arm 32 is pivoted to a suitable push-rod 34.

Disposed below the inlet valve passageway 26a and below the port 26 is the fuel injection port, indicated at 35, which is connected to the fuel injector 36. The injector 36 receives its supply of fuel from the fuel supply conduit 37 in the usual manner, and needs no detailed description.

Considering now in more detail the liner 16, this liner is disposed at the bottom of the cylinder 17, and is provided with the partition strip or wall 40, having the bearing portion 41 through which the connecting rod 19 extends. This partition wall 40 divides the upper cylinder 17 from the lower cross-head guide 15, and at its extreme edge provides the two valve passageways 42 and 43, valve passageway 42 communicating with the interior of the cylinder 17, and the valve passageway 43 communicating with the interior of the chamber 43' above the cross-head guide 15. Connecting the two valve passageways 42 and 43 is a valve cage, indicated in its entirety by the numeral 44, which is adapted to receive the reciprocable plug valve 45.

This valve 45 has the two valve enlarged ends 46 and 47, the end 46 controlling the valve passageway 42 and the end 47 controlling the valve passageway 43. The enlarged ends 46 and 47 are joined by the connecting stem 48, and preferably the entire plug is made as an integral unit, and is connected by means of the connecting rod 49 to a suitable cross-head 50 disposed in a cross-head guide 51. The cross-head 50 has its cross-head pin 52 connected by means of the connecting arm 53 to a suitable eccentric 54 mounted on the cam shaft 12, which eccentric is adapted to be rotated with the cam shaft 12 for causing reciprocatory movement of the cross-head 50 and consequently reciprocatory movement of the valve plug 45.

The valve cage 44 is provided with an outlet port 55 located centrally between the port 56 connected to the valve passageway 42 and the port 57 connected to the valve passageway 43. This outlet port 55 extends transversely of the valve cage, and is adapted to open into a receiving chamber 58, which is disposed around the exterior of the cross-head guide 15 and which provides a chamber for receiving the air pumped by the underside of the piston 21 and by the cross-head 14, and, as shown in Figure 2, extends between the two cylinders of the engine. This chamber acts as a storage space for storing the air used for scavenging and supercharging the engine, and is provided with an outlet opening 59 adapted to open into a vertical manifold 60 disposed thereon and secured thereto as by means of the stud bolts 61. This manifold 60 extends upwardly from the received chamber 58 and is provided with the two laterally extending conduits 62 and 63, which lead to the inlet valve passageways 26 of the two cylinders. The manifold is secured to the cylinder block by means of suitable stud bolts 64, and thus the air from the receiver chamber 58 is adapted to be conducted through the manifold 60 into the valve passageways 26.

It will be noted that the valve cage 44 is open to atmosphere at both the top and bottom thereof, as indicated by the openings 65 and 66. These atmospheric ports are for the purpose of supplying fresh air to the under side of the piston and to the chamber 43' in which the cross-head 14 operates for the purpose of permitting the air supply to the engine to pass into these chambers and to be compressed by the movement of the cross-head and piston therein.

In the operation of the engine, the crank shaft 6 and the cam shaft 12 both rotate in a counter-clockwise direction, and, as shown in Fig. 1, the crank throw 7 is at its lowermost position when the eccentric 54 is at its half-way position. Thus, the piston 21 and the cross-head 14 are in their lowermost position when the eccentric 54 is at its half-way position and the valve plugs 46 and 47 effectively close the inlet ports 56 and 57. The piston is, at this particular point, at the bottom of its explosion and exhaust stroke, and is commencing its compression stroke, and the exhaust ports 25 are substantially completely uncovered. The valve 28 may be set with respect to the cam shaft so that it is seated upon the seat 27 only after the piston begins its upward movement and thus permits no air to escape after the piston has closed the exhaust port. Air which had previously been admitted to the cylinder for the purpose of thoroughly scavenging the same and which was forced into the cylinder under a considerable pressure from the chamber 58, is thereby trapped in the cylinder, as the piston begins its upward stroke, since the exhaust ports 25 are closed thereby, and the air is subjected to further compression. At the same time, the eccentric 54 is being rotated toward its lowermost position, and consequently draws the cross-head 50 downwardly in the guide 51. This causes the valve plugs 46 and 47 to be drawn downwardly, and permits air to enter through the air inlet opening 65 and to pass through the inlet port 56 to the under side of the piston through the valve passageway 42. Air is sucked up into the cylinder beneath the piston 21 by reason of the vacuum formed by the upwardly moving piston. At the same time, the air which has been trapped in the chamber 43' is being compressed by the upward movement of the cross-head 14, and passes through the valve passageway 43 to the inlet port 57. However, the valve plug 47 has been drawn downwardly to close off the air inlet 66 and to provide a passage from the valve passageway 43 through the inlet port 57 to the outlet port 55 of the valve cage 44. Therefore, the air being compressed in the chamber 43' is forced into the receiver chamber 58.

As the piston and cross-head reach their uppermost position, the eccentric 54 has been rotated to a position exactly 180° from the position shown in Fig. 1, and the valve plugs 46 and 47 are again in position to close the ports 56 and 57. Therefore, the air compressed in the chamber 43', and which has been forced through the outlet opening 55 into the receiving chamber 58 is trapped therein, since the valve 28 has been closed during this portion of the cycle, and is maintained in the chamber 58 under a considerable pressure. The fuel injector operates as the piston reaches its upper dead center position and a charge of fuel is forcibly injected into the cylinder above the piston, being exploded by the high temperature due to the compression of the air. The explosion forces the piston downwardly on its power stroke.

Referring now to Fig. 2, this discloses one of the cylinders of the engine with the piston in its uppermost position, or at a position just prior to the fuel injection and consequent explosion. As will be noted, the projecting head portion 22 of the piston 21 is entering the space 23 at the top of the cylinder 17 and air which has been trapped in the annular space 69 surrounding the head portion 22 is being forced upwardly through the angularly disposed grooves 70 into the explosion chamber indicated at 71. These angularly disposed grooves 70 are adapted to give a turbulent whirl to the air, and provide a thorough mixing of the air with the fuel injected through the fuel injection port 35. This is shown by the arrows appearing in the explosion chamber 71 shown in Fig. 2.

As the piston starts on its downward or explosion stroke, the eccentric 54 rotates toward its uppermost position, and consequently forces the cross-head 50 and the associated plug valve mechanism 45 upwardly. The suction produced in the chamber 43' by the downward movement of the cross-head 14 draws air from the outside into the opening 66 and through the port 57 into the valve passageway 43 and thence into the chamber 43'. At the same time, the valve plug 46, being in its uppermost position, allows air being compressed by the under side of the piston 21 to be forced through the valve passageway 42 and inlet port 56 down into the outlet port 55 of the cage 44 and thence into the receiver chamber 58. It will be noted, in connection with this movement, that at no time is the outlet port 55 so opened as to permit the escape of compressed air contained in the chamber 58 to either the chamber 43' or the chamber below the piston 21, since the valve plugs 46 and 47 shut off these passageways during the uppermost and lowermost portions of movement of the piston and cross-head.

Upon upward or downward movement of the valve plugs 46 and 47, the construction is such that the atmospheric opening is connected through the proper inlet port to the chamber which is being subjected to vacuum due to the displacement of either the piston or cross-head, and that the outlet port 55 is opened at the same time to the chamber in which the air is being compressed. Therefore, during all reciprocating portions of the stroke of the piston, the receiver chamber 58 is open to the flow of compressed air from either the chamber 43' or from the cylinder, and the inlet chambers of the valve cage member 44 are opened either to the chamber 43' or the cylinder 17, whichever is under the influence of suction. Thus, both the upward and downward strokes of the piston 21 are effective to produce a compression of air and consequent forcing of the air into the receiver chamber.

As the piston 21 nears the end of its explosion stroke, the cam shaft 12, which is provided with the cam portions 72 and 73, is so rotated as to engage the valve push rod 34 for opening the valve 28. This permits a flow of compressed air from the manifold 60 through the valve passageway 26 into the explosion chamber, and forces the products of combustion occasioned by the explosion in the cylinder out through the exhaust ports 25. The air thus effects a very thorough scavenging action, and forces all of the products of combustion out of the cylinder. As the piston passes its lower dead center position, the valve 28 begins to close, and, as the piston begins to rise on its compression stroke, the supercharged air which has been forced into the cylinder or compression chamber under pressure from the chamber 58 is trapped and is further compressed by the piston. Thus, a supercharged supply of air, under pressure, is present in the cylinder when the piston commences its compression stroke, and serves to increase the pressure obtainable in the air cylinder. The valve 28 remains closed during the entire compression stroke and the succeeding explosion stroke until the piston 21 again approaches its lower dead center position, when it opens to produce the scavenging effect and supercharging effect as described above.

It will be noted that the liner 16 together with the cross-head guide 15, the valve cage 44 and the associated parts thereof, can be readily removed, and the entire assembly may be easily mounted and dismounted. If desired, the liner 16 with its associated valve mechanism may be so constructed as to be insertable in standard types of engines now on the market, so that these engines may be provided with the scavenging and supercharging effects which are possible by the use of such a construction.

Referring now to the embodiment shown in Fig. 3, I have disclosed therein a similar type of cross-head, but have provided an automatic breather valve instead of the mechanically driven eccentric valve plug construction shown in connection with Figs. 1 and 2. Referring more in detail to this modification, the crank case of the engine is indicated generally by the reference numeral 75. The main cylinder is indicated by the numeral 76, and interposed between the cylinder 76 and the crank case 75 is the liner indicated generally by the numeral 77, this liner having a suitable partition wall 78 provided with a bearing portion 79 for receiving the rod 80 connecting the piston operating in the cylinder 76 and the cross-head 82.

The lower end of the piston rod 80 is secured in a projecting stud portion 81 of the cross-head 82, and the cross-head is secured for reciprocal movement in the cross-head guide 83. A suitable connecting rod 84 is pivoted at its upper end to the cross-head 83, and at its lower end is connected to the crank shaft, as disclosed in connection with Figs. 1 and 2. Surrounding the liner 77 and cross-head guide 83 is an annular chamber 85 formed by a surrounding member 86 and the lower radially flanged portion 87 thereof. This cylindrical member 86 is secured internally in the top of the crank case 75, and the radially flanged wall 87 fits about the cross-head guide 83 and is suitably secured thereto as by means of the pin key member 88. A rib member 89, cast integral with the member 86, fits about the upper portion of the cross-head guide 83, and is secured to the liner 77 for supporting the same. Disposed on opposite sides of the cylinder 76 are two breather valve cages, indicated generally by the reference numerals 90 and 91.

The lower portion of the cylinder 76 is adapted to communicate with the valve cage 91 by means of the valve passage 92, which opens into the central portion of the valve cage 91. Similarly, the upper end of the cross-head guide 83 is adapted to open through the passageway 93 into the central portion of the valve cage 90.

Each of the breather valve cages 90 and 91 is provided with cap members 94, these cap members being secured upon the upper peripheral surface of the valve cages, and being concentrically aligned therewith by means of the central bolt members 95 extending downwardly therethrough and secured at their lower ends by means of the nuts 96. Each of the cap members 94 is provided with the openings 97, which are adapted to communicate with the interior of the breather valve cages 90 and 91.

Suitable valves 98 are provided for the purpose of controlling the inlet passages 97, and these valves 98 are supported by means of the springs 99 which have their lower ends biased against the spring seat 101 and which have their upper ends biased against the valve members 98. Suitable guide pins 102 are provided for the purpose of properly aligning the valves 98 with the inlet ports 97. The spring seat 101 is adapted to be mounted concentrically on the aligning bolt 95, and rests upon a central integral portion 103 of the valve cage members 90 and 91.

Suitable outlet openings 104 are provided at the lower portions of the valve cage members 90 and 91, and correspond to the inlet opening 97 provided in the cap or cover members 94. A second spring seat 105 is provided below the valve cage members 90 and 91 and is secured to the bolt 95 by means of nuts 96. Each of the spring seats 105 is provided with the upstanding boss portions 106 which are adapted to provide alignment for the springs 107 which carry the valves 108 thereupon. This construction corresponds to the construction described in detail in connection with the inlet openings 97. Suitable guide pins 109 corresponding to the guide pins 102, are provided for the purpose of aligning the valves 108 with the outlet ports 104.

In the operation of this form of my invention, the cross-head 82 is depicted as moving upwardly toward the completion of the compression stroke of the engine. As this occurs, the air in the chamber above the cross-head 82 is compressed and forced through the passageway 93 into the central portion of the valve cage member 90. Since the inlet ports 97 of the valve cage member 90 are closed, due to the increased pressure in the interior of this cage member, the valves 108 thereof are forced away from their seats and uncover the outlet openings 104 for permitting the compressed air to pass therethrough into the receiver chamber 85. These valves 108 are forced downwardly against the pressure of the springs 107, and operate only upon an increase in pressure of the air which is greater than the pressure of the springs 107. As the cross-head 82 approaches the top of its stroke, the air in the chamber above the cross-head is forced under pressure into the receiver chamber 85.

At the same time, the piston (not shown) is moving upwardly, and the under side thereof, in moving upwardly, produces a suction in the passageway 92, causing the valves 108 carried by the valve cage 91 to be drawn into closed position, being held there by the pressure of the springs 107, and the suction below the piston. The suction is such that the valves 98 of the valve cage member 91 are drawn downwardly against the pressure of the springs 99 to uncover the inlet ports 97 and fresh air is drawn in through these ports and through the passageway 92 into the lower portion of the cylinder 76.

As the cross-head and piston reach their upper dead center position, the suction in the chamber 92 is reduced and the valve members 98 of the valve cage 91 are closed by the pressure of the springs 99 to close the inlet openings 97. At the same time, the valve members 108 carried by the valve cage 90, since there is no more flow of compressed air from the passageway 93 into the valve cage member, close under the pressure of the springs 107 and thus shut off the receiving chamber 85 therefrom. Therefore, at this upper dead center position of the cross-head and piston, all of the valves of both the valve cages 90 and 91 are closed.

As the piston and cross-head commence their downward movement, the under side of the piston compresses the air in the lower portion of the cylinder 76, and this compressed air is forced through the passageway 92 into the central portion of the valve cage member 91. The increased pressure of the air therein forces the valves 108 thereof to move downwardly against the pressure of the springs 107 and to uncover the outlet openings 104, permitting this compressed air to flow into the receiver chamber 85. It will be noted that the valve members 98 of the valve cage 91 will remain in closed position.

Considering now the valve cage member 90, the downward movement of the cross-head 82 produces a suction in the space above the cross-head which is defined by the cross-head guide 83, and consequently produces a suction in the chamber 93 communicating with the central portion of the cage member 90. This suction tends to keep the valve members 108 in closed position, since the pressure within the chamber 85 is acting on the under surface of the valve members. Consequently, the suction produced in the central portion of the valve cage 90 is effective upon the valves 98 thereof to force these valves to open against the pressure of the springs 99 and allow fresh air to flow through the inlets 97 into the passageway 93 and thence into the cross-head chamber.

Thus, during the time that the cross-head 82 is compressing air and forcing it into the receiver chamber, the under side of the piston is drawing fresh air into the lower portion of the cylinder 76. As the operation is reversed, and the cross-head begins to move downwardly, the under side of the piston forces the air previously drawn in down through the valve members 108 of the valve cage 91 into the receiver chamber, and the cross-head simultaneously draws in air which will be compressed upon the upward stroke of the cross-head during the next cycle of operation. It is thus apparent that during all movements of the piston and cross-head there will be a supply of compressed air being forced into the receiver chamber 85, and simultaneously a supply of fresh air being drawn in for compression upon the next succeeding cycle of operation of the engine. The air in the receiver chamber 85 is conducted, as described in connection with Fig. 1, through a suitable manifold to the air inlet opening positioned adjacent the top of the cylinder 76, where it will be effective to produce a thorough scavenging and supercharging effect when the valve is opened.

It is apparent, therefore, that by providing the cross-head in the engine below the piston the pumping action of the under side of the piston is supplemented by the pumping action of the cross-head so that at all times there will be a supply of compressed air being delivered to the receiver chamber. Further, the interposition of the cross-head between the piston and the crank case will prevent the dilution of the lubricant in the crank case, caused by fuel seeping down past the side walls of the cylinder and which formerly entered the crank case. Also, the compressed air which is admitted to the cylinder will not be capable of providing a flushing action upon the lubricant in the crank case.

The invention is equally applicable whether the valves controlling the pumping action of the piston and the cross-head are mechanically driven or are of the automatic breather types. I have found that for very high speed motors the mechanically driven valve may be more efficient, due to the positive control of the valve passageway. However, the automatic breather valves present an advantage in that there is no necessity for providing additional mechanical connections from the cam shaft to the valves. In this connection it is to be noted that the eccentric mechanically driven valves are silent in operation, which may be desirable in certain types of engine.

Referring more in detail to the extending head portion 22 of the piston 21, it will be apparent that a very thorough mixing and atomizing action is effected by means of the angularly disposed grooves 70 formed therein which provide a whirling or turbulent air stream immediately adjacent the point of fuel injection when the compression stroke is nearing its completion, which means that the fuel injected will thoroughly mix with all portions of the compressed air and will afford a uniform explosion over the entire surface of the piston.

I do not intend to be limited to the exact details shown and described in connection with the accompanying illustrated embodiment of my invention, but only in so far as defined by the scope and spirit of the appended claim.

I claim:

In an internal combustion engine, a cylinder, a piston reciprocatory therein, a second cylinder disposed in alignment with said first cylinder, a crosshead reciprocatory in said second cylinder and having conjoint movement with said piston, a pair of atmospheric ports, one of said ports communicating with the piston cylinder beneath the piston, and the other port communicating with said second cylinder above said crosshead, a receiving chamber disposed about said crosshead cylinder and communicating with said piston cylinder above said piston, port means for conducting air under pressure from the under side of said piston and from above said crosshead into said receiving chamber, and pressure actuated breather valve means for alternately opening and closing said ports.

RAYMOND E. WHITE.